Patented Aug. 24, 1943

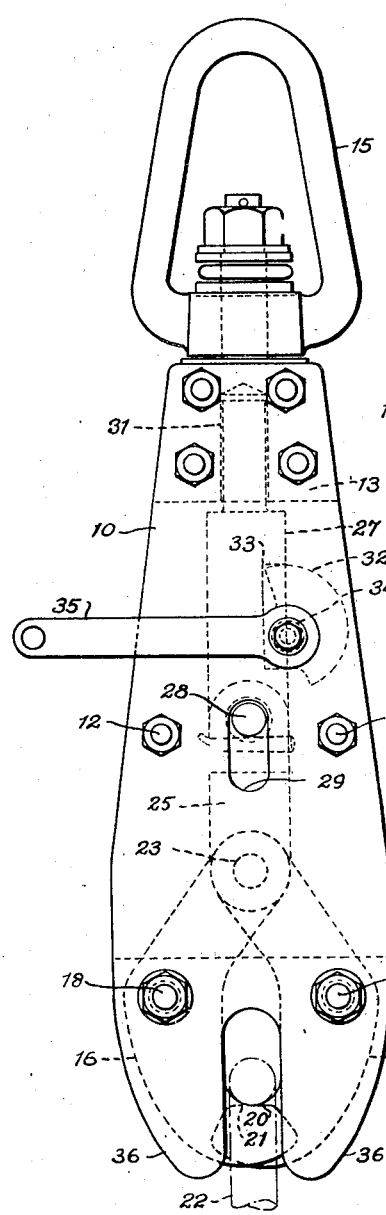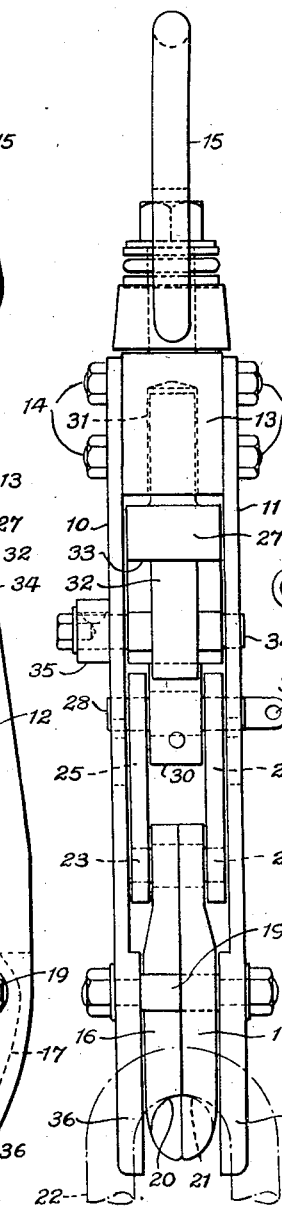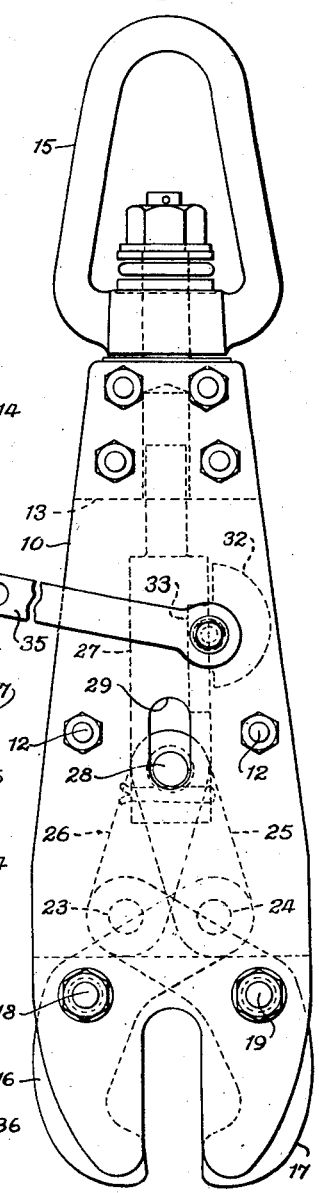

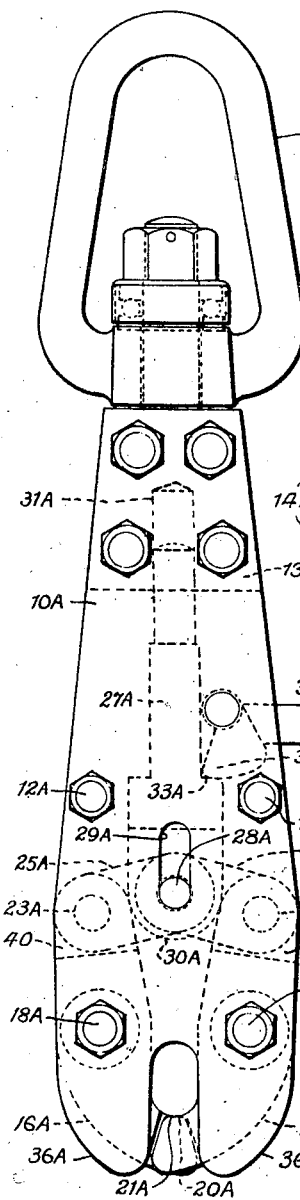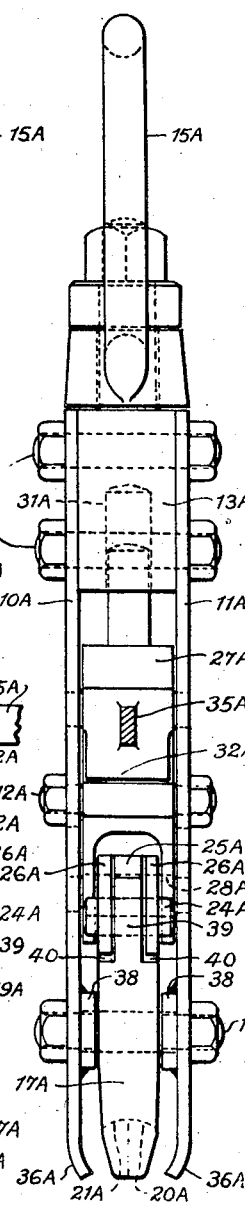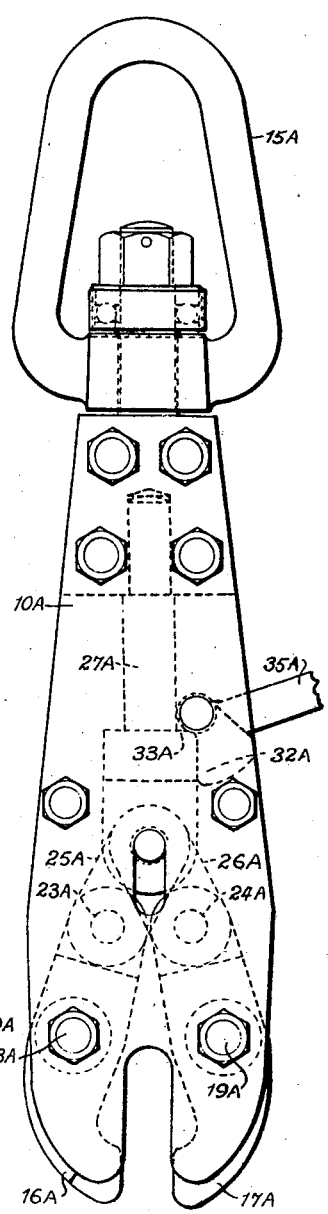

2,327,751

UNITED STATES PATENT OFFICE 2,327,751

HOOK COUPLING

George Rodham Unthank, New Southgate, London, and Henry Arthur John Silley, London, England Application November 6, 1942, Serial No. 464,752
In Great Britain November 20, 1941

6 Claims. (Cl. 294—83)

This invention relates to hook couplings of the kind including a pair of hooks arranged to overlap each other when in the closed position to form a part of a ring adapted to engage an eye of a load and to be opened at the will of an operator to effect disengagement.

An object of the invention is to provide an improved suspension coupling of this kind for use on the rope of a crane, derrick, hoist, winch or the like whereby disengagement from the load may be effected at the required moment with certainty. A further object is to provide such a coupling which is capable of instantaneous release from the load whilst still subjected to the pull of the load. Yet another object is to provide such a coupling which is suitable for operation under heavy loads.

Two embodiments of the invention will be described by way of example with reference to the accompanying drawings, in which:

Figs. 1 and 2 are side elevations of a form of the coupling suitable for relatively light loads, shown closed and opened respectively, Fig. 3 is an end elevation of the same coupling when closed, Figs. 4 and 5 are side elevations of a heavy duty coupling shown closed and opened respectively, and Fig. 6 is an end elevation of this heavy-duty coupling when closed.

In the example shown in Figs. 1, 2 and 3, the coupling body comprises front and back wall plates 10 and 11 of elongated form held in suitable spaced relationship by spacing bolts 12 (omitted from Fig. 3) and a block 13 to which the plates 10 and 11 are secured by screw studs 14 and which is provided with a swivelling shackle 15. Near the end of the body opposite to the shackle end a pair of hooks 16 and 17 of generally arcuate form are mounted to rock intermediate their ends about pivots formed by pins 18 and 19 extending through the front and rear plates 10 and 11. These pins are parallel with one another and symmetrically disposed in spaced relationship on the two sides respectively of the centre line of the coupling body.

The working ends of the hooks are shaped to overlap one another when in the closed position to form a part of a ring for engagement with the eye 22 or equivalent member of the load, but the eye-engaging surfaces 20 and 21 are so formed that, when viewed in a direction parallel to the axes of the pivot pins 18 and 19, they are approximately perpendicular to the longitudinal centre line of the coupling so that the load will exert on the hooks a turning moment in the opening direction which is large enough to overcome the frictional resistance of the eye 22 on the hooks and of the pivot pins so that the hooks tend to open under load.

The other ends of the hooks are also arranged to overlap but in the open position, and these ends are pivotally connected by pins 23 and 24 to links 25 and 26 which are coupled to one end of a tension member formed by a rod 27 mounted for guided longitudinal movements of limited extent within the coupling body. The links are connected to the rod 27 through a common pin 28 extending through an eye-lug 30 at the end of the rod 27 and through slots 29 of limited length formed in the body wall plates 10 and 11 whereby limitation of the movement of the rod is achieved. The upper end of the rod is guided in a bore 31 in the block 13.

The rod 27 is held in one of its extreme positions by the engagement of a detent 32 in a recess 33 formed in the rod 27. The detent is fixed to a shaft 34 rotatable in bearings in the plates 10 and 11, and a lever 35 is fixed to the shaft 34 to enable the detent to be rocked at the will of an operator to release the rod 27 for movement.

When the rod 27 is retained by the detent 32, the links hold the hooks closed upon the eye or equivalent member of the load, as shown in Figs. 1 and 3, and in this position the pivotal connections of the hooks 16 and 17 and the links 25 and 26 are substantially co-axial. When the detent 32 is moved to the position shown in Fig. 2 and the rod 27 is thus freed, the hooks open under the pull of the load, and they are caused to make similar and simultaneous movements by the links 25 and 26 as the rod 27 moves towards the hooks, the ends of the links connected with the hooks taking up symmetrically disposed positions on each side of the centre line of the coupling body.

Preferably the wall plates 10 and 11 of the coupling body extend to approximately the working ends of the hooks and are slotted to provide pairs of spaced guiding horns 36 which engage on each side of the eye or equivalent member of the load when said eye is held by the hooks, and serve to guide said eye and prevent it from following either one of the hooks as the latter move to the open position.

A lifting eye 37 is provided outside the coupling body at at least one end of the common pin 28 connecting the links and the movable rod 27, in order to enable the rod 27 and the links to be moved and the hooks closed. The detent 32 and the operating lever 35 therefor are so shaped and disposed that the detent makes automatic retaining engagement with the recess 33 in the rod 27 by gravity, when the rod 27 has been moved to the required extent.

The heavy-duty coupling shown in Figs. 4, 5 and 6 is generally similar to the example just described, and corresponding parts are denoted by the same reference numerals with the addition of A in the second example.

There are, however, important differences in the details of the arrangement of the hooks and the means for locking them in the closed position.

The pivot pins 18A and 19A of the hooks are again parallel to one another and symmetrically disposed in spaced relationship on the two sides respectively of the centre line of the coupling body, the seatings of these pins on the body wall plates being reinforced by rings such as 38 secured to these plates by welding. Each hook bears on its pivot pin over the whole length of that part of the pin lying between the rings 38. The working ends of the hooks are stepped, as shown in Figs. 4 and 5, so as to overlap one another when in the closed position.

The outer end of the hook 17A is of reduced thickness at 39 and carries a pin 24A serving as a connection for a pair of links 26A lying one on each side of the hook. The other end of the hook 16A is forked at 40, this fork being pivotally connected by a pin 23A to one end of a link 25A the other end of which is connected, together with the links 26A, by a pin 28A, to a forked lug 30A at the end of a compression member 27A mounted for guided longitudinal movement within the coupling body. The compression member 27A is held in the position shown in Fig. 4 by a detent 32A co-operating with a step 33A formed on the compression member.

The lever arms of the hooks 16A, 17A, between the pivot pins 18A, 19A, and the link pins 23A, 24A, co-operate respectively with the links 25A, 26A to form two like toggle mechanisms which are so arranged that their mechanical advantage, in the sense from the hooks to the slidable compression member 27A, is relatively low when the coupling is closed, the toggles then being in their fully broken position, as shown in Fig. 4, and that the mechanical advantage increases as the coupling opens, the toggles then approaching their straight position. By this arrangement the axial load imposed on the compression member by the links is minimised, and the release of the detent is accordingly facilitated.

We claim:

1. A hook coupling of the kind specified including a coupling body bearing a shackle at one end, a pair of hooks pivoted on the body near its other end and arranged to overlap one another in the closed position to form a part of a ring for engagement with an eye of a load, the working ends of said hooks being so shaped that they tend to move into the open position under the pull of the load, a member mounted for limited movement within said coupling body, two links respectively connecting said hooks with said movable member for maintaining said hooks closed when said movable member is in a position such that the load imposes through said links a force capable of displacing said movable member in one sense, a movable detent for retaining said movable member against such displacement, and control means for releasing said detent and thereby permitting said displacement of the movable member as the load opens said hooks.

2. A hook coupling of the kind specified including a coupling body bearing a shackle at one end, a pair of pivot pins on said body near its other end disposed transversely and on opposite sides respectively of the longitudinal centre line of said body, a pair of hooks pivoted on said pins respectively and having working ends capable of overlapping one another in the closed position to form a part of a ring for engagement with an eye of a load, said working ends being so shaped that they tend to move into the open position under the pull of the load, a member mounted for limited movement within said coupling body, two links respectively connecting said hooks with said movable member for maintaining said hooks closed when said movable member is in a position such that the load imposes through said links a force capable of displacing said movable member in one sense, a movable detent for retaining said movable member against such displacement, and control means for releasing said detent and thereby permitting said displacement of the movable member as the load opens said hooks.

3. A hook coupling of the kind specified including a coupling body bearing a shackle at one end, a pair of pivot pins on said body near its other end disposed transversely and on opposite sides respectively of the longitudinal centre line of said body, a pair of hooks pivoted on said pins respectively and having working ends capable of overlapping one another in the closed position to form a part of a ring for engagement with an eye of a load, said working ends being so shaped that they tend to move into the open position under the pull of the load, a tension member mounted for limited longitudinal movement within said coupling body, two links respectively connecting said hooks with said tension member for maintaining said hooks closed when said tension member is in a position such that the load imposes through said links a force capable of displacing said tension member in one sense, a detent movably mounted on said coupling body for retaining said tension member against such displacement, and control means operable for releasing said detent and thereby permitting said displacement of the tension member as the load opens said hooks, and means for moving said tension member into said one position.

4. A hook coupling of the kind specified including a pair of body wall members disposed longitudinally of the coupling in spaced relationship, a shackle secured to one end of said wall members, a pair of horns at the other end of each of said wall members forming between them a longitudinal slot, a pair of pivot pins spanning between said wall members transversely and on opposite sides respectively of the longitudinal centre line of the coupling, a pair of hooks pivoted on said pins respectively and having working ends capable of overlapping one another in the closed position to form a part of a ring for engagement with an eye of a load, when the eye is engaged in said slots, said working ends being so shaped that they tend to move into the open position under the pull of the load, a tension member slidably guided between said body wall members for limited longitudinal movement, two links respectively connected to said hooks at parts thereof which overlap one another in the open position, said links being also connected to said tension member, a movable detent carried by said wall members and capable of holding said tension member in a position such as to retain said hooks in their closed position, and control means operable for disengaging said detent from said tension member, each of said links at all times lying at an angle of between 90 and 180 degrees with a line joining the center of the pivot of the respective hook to the center of the connection of the link with the hook.

5. A hook coupling of the kind specified including a coupling body bearing a shackle at one end, a pair of hooks pivoted on the body near its other end and arranged to overlap one another in the closed position to form a part of a ring for engagement with an eye of a load, the working ends of said hooks being so shaped that they tend to move into the open position under the pull of the load, a member mounted for limited movement within said coupling body, two links respectively connecting said hooks with said movable member for maintaining said hooks closed when said movable member is in a position such that the load imposes through said links a force capable of displacing said movable member in one sense, a movable detent for retaining said movable member against such displacement, and control means for releasing said detent and thereby permitting said displacement of the movable member as the load opens said hooks, said links co-operating with said hooks to form toggle mechanisms the mechanical advantage of which, in the sense from said hooks to said movable member, increases as said hooks move from the closed to the open position.

6. A hook coupling of the kind specified including a coupling body bearing a shackle at one end, a pair of pivot pins on said body near its other end disposed transversely and on opposite sides respectively of the longitudinal centre line of said body, a pair of hooks pivoted on said pins respectively and having working ends capable of overlapping one another in the closed position to form a part of a ring for engagement with an eye of a load, said working ends being so shaped that they tend to move into the open position under the pull of the load, and said hooks having lever ends which extend on the side of the respective pivot pins remote from said working ends and which are shaped to rock towards and away from each other without overlapping each other, a compression member mounted for limited longitudinal movement within said coupling body, two links pivotally connected to said compression member and extending on opposite sides respectively of said centre line to pivotal connections with the respective lever ends of said hooks, a movable detent for maintaining said compression member in a position such that each of said links makes with its associated hook lever end an angle exceeding 90° and substantially less than 180°, whereby said hooks are held in the closed position, and control means operable for releasing said detent to permit the load to open said hooks.

GEORGE RODHAM UNTHANK.
HENRY ARTHUR JOHN SILLEY.